United States Patent
Rogers et al.

(10) Patent No.: US 8,463,426 B1
(45) Date of Patent: Jun. 11, 2013

(54) COMPUTERIZED BULK PARTS CONTROL SYSTEM AND METHOD

(75) Inventors: Carla Rogers, Dillon, SC (US);
Veronica Harden, Florence, SC (US);
Nancy Baker, Florence, SC (US);
Kazuhiko Honda, Florence, SC (US)

(73) Assignees: Honda Motor Co., Ltd., Tokyo (JP);
Midwest Express Inc., East Liberty, OH (US)

( * ) Notice: Subject to any disclaimer, the term of this patent is extended or adjusted under 35 U.S.C. 154(b) by 825 days.

(21) Appl. No.: 12/608,699

(22) Filed: Oct. 29, 2009

(51) Int. Cl.
*G06F 7/00* (2006.01)

(52) U.S. Cl.
USPC ............................ 700/215; 701/469; 235/375

(58) Field of Classification Search
USPC .................................................. 700/214, 215
See application file for complete search history.

(56) References Cited

U.S. PATENT DOCUMENTS

| | | | |
|---|---|---|---|
| 4,514,815 A * | 4/1985 | Anderson | 700/215 |
| 2003/0178481 A1* | 9/2003 | Kondo et al. | 235/375 |
| 2006/0224273 A1* | 10/2006 | Cheng et al. | 700/215 |
| 2009/0082962 A1* | 3/2009 | Kim et al. | 701/213 |

\* cited by examiner

*Primary Examiner* — Gene Crawford
*Assistant Examiner* — Kyle Logan
(74) *Attorney, Agent, or Firm* — Standley Law Group LLP

(57) ABSTRACT

A computerized bulk parts control system and method. Parts are repacked (consolidated or divided) and palletized to prevent production problems such as unnecessary shortages of parts. Parts are traced from departure at a supplier's facility to arrival at a manufacturer's facility and then to production line side delivery. Traceability data is collected at various stages in the parts transportation, repacking, and delivery processes. The traceability data allows the manufacturer to evaluate information regarding the impact of late shipments and short shipments as well as changes in the production schedule. The computerized system and method creates a "part history" for each part that facilitates its delivery to the right place at the right time. The history allows the manufacturer to trace parts to their origins which is important for many quality control activities. The history also allows the manufacturer to track and replace parts used outside of a normal production sequence.

21 Claims, 11 Drawing Sheets

112

1) Production Number
2) Lot Number
3) Category
4) Part Number
5) Design Number
6) Item
7) Name
8) Part Color
9) MFG Number
10) Case Number
11) Type
12) Number
13) Packaging
14) Delv. Loc.
15) R Category
16) Case
17) Packing Number
18) QTY
19) P Number
20) Style Number
21) Operator
22) Line
23) B Category
24) Pack Date
25) Supplier
26) Serial
27) Option
28) Model
29) Part Desc.
30) Item
31) Control Number

110

| NO. | NO. | | |
|---|---|---|---|
| MODEL | B | | |
| 642 | −0000 | | |
| NUT | | | |
| COLOR | | | |
| CONTROL NO. | | Q'TY IN CASE | |
| PACKING MARK | | Q'TY IN PACKING | |
| P'BAG USING RULE | | Q'TY IN P'BAG | |
| | | SEQ NO. | |

CONTENTS

FIG-2

COMPUTERIZED BULK PARTS CONTROL SYSTEM AND METHOD

CROSS-REFERENCE TO RELATED APPLICATIONS

None.

FIELD OF THE INVENTION

The present invention relates generally to automated bulk parts control systems and methods. In particular, the present invention relates to an automated bulk parts control system and method for tracking bulk parts and for receiving, consolidating, and dividing bulk parts for delivery and use on a manufacturer's production line.

BACKGROUND OF THE INVENTION

Manufacturers often use a variety of bulk parts such as nuts, bolts, screws, washers, spacers, covers, etc. in their products. Different products or even models of a product may require different types of nuts, bolts, screws, etc. as well as different quantities of each part. The types of bulk parts that are required on the production line at any particular time depend on the type of product under production. If associates working on the production line do not have the right parts in the quantity they need, production can slow or even be halted until the appropriate parts are available. It is important therefore, for the right parts in the right quantity to be available to the manufacturing associates.

Bulk parts are often shipped in quantities that do not necessarily correspond to the quantities required line side for a particular production run. In some cases, the bulk part packages contain more parts than are needed while in other cases they contain fewer parts than are needed. While maintaining a line side inventory of bulk parts would ensure that associates always have needed parts available, such an approach is impractical and costly. First, storing parts line side consumes a substantial amount of floor space. In some instances, space constraints may simply not allow the manufacturer to store parts line side even temporarily. In addition, associate time and effort is required to locate the specific parts that are needed at any particular time during production. The availability of parts other than those that are needed at a particular time can cause confusion on the production line as associates search for the right part and may result in production mistakes as wrong parts are selected. Finally, maintaining an inventory of parts, whether line side or elsewhere in the manufacturing facility, is costly.

To increase efficiency and reduce the likelihood of errors as well as to minimize line side space requirements, manufacturers often repack bulk parts into smaller packages and place multiple packages in bins or totes for line side delivery as the parts are needed during production. It is important, therefore, for associates to be able to distinguish parts that are delivered line side in a single bin or tote. Delivery of the rights parts in a location and quantity required to meet immediate production needs reduces the likelihood that the wrong part is used and makes the most efficient use of line side space.

Although a manufacturer may order parts in quantities sufficient to meet its production needs, parts shortages can occur for a variety of reasons. Because parts are transported and repacked before they are used in production, there is a possibility they will be lost or misplaced at some point during transit to or at the facility as well as during repacking. Parts shipments from suppliers may be delivered late or they may be short. While well-defined procedures for receiving, repacking (consolidating or dividing), and delivering parts to a production line may be used for parts that arrive in a timely manner, parts shortages may require the manufacturer to bypass the usual procedures and use other measures to get the parts line side. For example, parts that are typically delivered by truck may need to be delivered by air to meet the manufacturer's production schedule. Because the parts are delivered outside the normal procedure, they may not be included in the manufacturer's standard parts tracking system and procedures.

Problems may also occur when excess parts are available. Excess parts may result when the production schedule changes or shipments with excess parts are delivered. If excess parts are not removed from the production line delivery process and tracked, they may simply be lost. If they are delivered line side but not needed for the current production run, they may be set aside and forgotten. While they could be used in future shortages, associates may not know where to find them when needed. If a shortage occurs, it is important to know whether excess parts are available to resolve the shortage and to reduce or eliminate the need to find parts from another source. Therefore, it is important to be able to include excess parts in the standard parts tracking system and procedures.

Although there are benefits to repacking and delivering bulk parts to meet immediate production needs, coordinating repacking and delivery activities to correspond with a production schedule is a difficult task, especially in a large facility where millions of bulk parts are consumed. Tracking of parts from their departure at a supplier's facility to arrival at a manufacturer's facility and on to line side delivery is important so that the manufacturer can confirm that it has and will have enough parts available to meet the production demand. Any tracking system must further account for various problems that can arise such as parts shortages and excesses. There is a need for a system and method for tracking and repacking parts for line side delivery to meet production demand at a manufacturing facility that also accommodates exceptions such as shortages and excesses.

SUMMARY OF THE INVENTION

The present invention is a computerized bulk parts control system and method for tracking bulk parts used in production. Parts are repacked (consolidated or divided) and palletized to prevent production problems such as unnecessary shortages of parts. Parts are traced from departure at a supplier's facility to arrival at a manufacturer's facility and then to production line side delivery. Traceability data is collected at various stages in the parts transportation, repacking, and delivery processes. The traceability data allows the manufacturer to evaluate information regarding the impact of late shipments and short shipments as well as changes in the production schedule.

Parts packaging and line side delivery corresponds to the manufacturer's production schedule which determines what parts are needed on the production line, when they are needed, and where they are needed. The computerized system and method creates a "part history" for each part that facilitates its delivery to the right place at the right time. The history allows the manufacturer to trace parts to their origins which is important for many quality control activities. Bulk parts that arrive in a single shipment may be distributed to different production line delivery locations for use on different products or product models. In other cases, it may be necessary to consolidate parts from multiple packages into different packages for delivery to the production line. When parts are divided or consolidated into different packages, new labels for the parts packages are generated and information for the repacked parts is entered in a computer application so that the parts can still be tracked and their origin can be determined. The traceability data allows the manufacturer to determine whether parts are available for use in production as well as where and when parts are actually used in production.

BRIEF DESCRIPTION OF THE DRAWINGS

FIG. 2 is a sample 2D barcode label according to an example embodiment.

DETAILED DESCRIPTION OF EXAMPLE EMBODIMENT(S)

Figure 1:
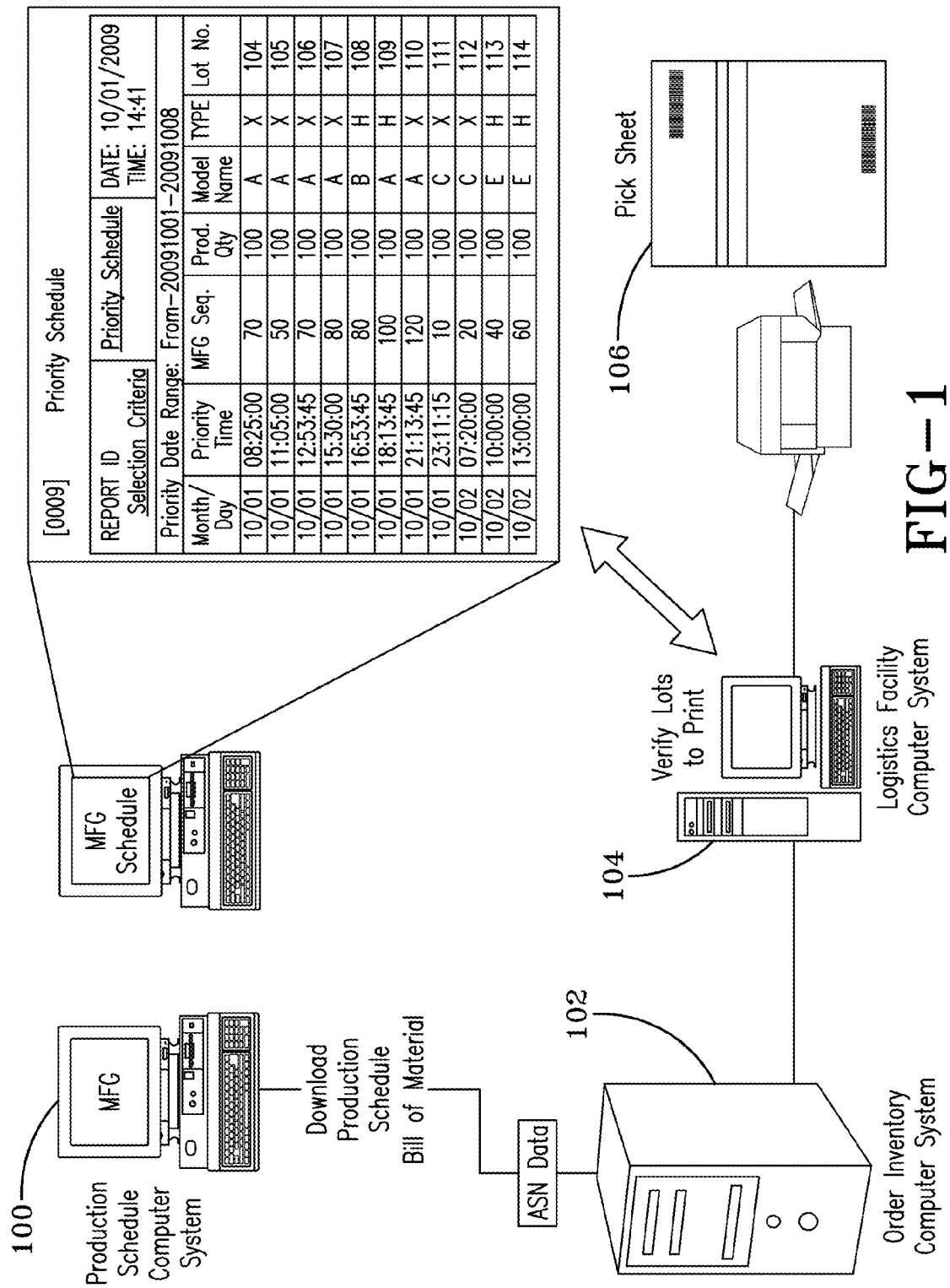
FIG. 1 is a block diagram illustrating parts data flow according to an example embodiment.

In an example embodiment of the present invention, a manufacturer's production schedule determines what bulk parts are needed for the products to be manufactured during a specific time period as well as when and where they are needed. An example production schedule as shown in Table 1 associates a production sequence identifier with a production lot number, product model, product model type, color, and quantity.

TABLE 1

Production Schedule

| MFG Seq. | Prod No. | MDL | Type | Color | Qty | Note |
|---|---|---|---|---|---|---|
| 105 | 6201 | A | X | RED | 100 | |
| 106 | 6301 | A | H | RED | 100 | |
| 107 | 6401 | C | H | BLUE | 100 | |
| 108 | 6501 | E | H | BLACK | 100 | |
| 109 | 6601 | B | X | BLACK | 100 | |
| 110 | 6701 | B | H | RED | 100 | |
| 111 | 6701B | A | X | BLUE | 150 | PRD Duplicate |
| 112 | 6702 | A | X | GREEN | 100 | |
| 113 | 6801 | C | H | GREEN | 100 | |
| 114 | 6901 | E | H | RED | 100 | |
| 115 | 7301 | B | X | BLACK | 100 | |

The product model (MDL), product model type (Type), color, and quantity (Qty) information determines what bulk parts are needed to manufacture products according to the production schedule. Bill of material (BOM) information identifies the specific parts by number and quantities of parts that are required to manufacture the products identified in the production schedule. The BOM information further identifies where the parts are needed on the production line. An example BOM table is shown in Table 2.

TABLE 2

Bill of Material Information

| Bill of Material Information BOM ABC123 | | | | | | | | | | | Oct. 1, 2009 | |
|---|---|---|---|---|---|---|---|---|---|---|---|---|
| | | Part # InEff Parts /On/After Current Day and On/Before  00/00/0000 | | | | | Color | | | | All Parts (mm/dd/yyyy) | |
| MDL | T P | C O L. | I C | Div Loc | Case/ Zone | Trl Cd | P I | Part Number | C O L. | Qy /U | Effective Begin | End |
| A | X | RED | 1 | LH | XX | 48 | 0 | ABC123456 | | 1 | 010307 | 999999 |
| A | X | RED | 1 | LH | XX | 48 | 0 | ABC123456 | | 1 | 010307 | 999999 |
| B | X | RED | 1 | LH | XX | 48 | 0 | ABC123456 | | 2 | 010307 | 999999 |
| B | X | RED | 1 | LH | XX | 48 | 0 | ABC123456 | | 4 | 010307 | 999999 |

The manufacturer orders parts according to information contained in the production schedule and BOM. When suppliers are ready to ship the parts that the manufacturer has ordered, they issue advance shipping notices (ASNs) that list the contents of a shipment of parts as well as additional information relating to the shipment such as order details, expected delivery date, product description, and type of packaging. The parts may be delivered to a manufacturer's logistics facility where they are unloaded from shipping containers and loaded in delivery containers for delivery to specified production line locations.

The production schedule, BOM, and ASN data may then be used to develop a priority schedule that specifies an order or sequence for the production sequences and therefore, for packaging and delivering parts to the production line. Production sequences may be controlled according to the priority time assigned to each one as shown in Table 3.

TABLE 3

Priority Schedule

| REPORT ID: | Priority | DATE: | Oct. 1, 2009 |
| Selection Criteria | Schedule | TIME: | 14:41 |
| | Priority Date Range: | From-20091001 - 20091008 | |

| Month/Day | Priority Time | MFG Seq. | Prod. Qty | Model Name | TYPE | Lot No. |
|---|---|---|---|---|---|---|
| Oct. 1 | 08:25:00 | 70 | 100 | A | X | 104 |
| Oct. 1 | 11:05:00 | 50 | 100 | A | X | 105 |
| Oct. 1 | 12:53:45 | 70 | 100 | A | X | 106 |
| Oct. 1 | 15:30:00 | 80 | 100 | A | X | 107 |
| Oct. 1 | 16:53:45 | 80 | 100 | B | H | 108 |
| Oct. 1 | 18:13:45 | 100 | 100 | A | H | 109 |
| Oct. 1 | 21:13:45 | 120 | 100 | A | X | 110 |
| Oct. 1 | 23:11:15 | 10 | 100 | C | X | 111 |
| Oct. 2 | 07:20:00 | 20 | 100 | C | X | 112 |
| Oct. 2 | 10:00:00 | 40 | 100 | E | H | 113 |
| Oct. 2 | 13:00:00 | 60 | 100 | E | H | 114 |

Referring to FIG. 1, a block diagram illustrating parts data flow according to an example embodiment is shown. Production schedule data, BOM part list data, and ASN data is transferred from a production schedule computer 100 to an order inventory system computer 102 that tracks the status of parts that have been ordered or are in inventory for use in production. Priority schedule data and related lot and parts data is transferred to a logistics facility computer 104 and used to generate a check sheet 106 that indicates to an associate which bulk parts and how many should be packed in a delivery container (e.g., bin, tote, box, or other type of container) for delivery to a production line side location. Parts may be consolidated or divided and packaged separately in bags, boxes, or other containers and then added to a delivery container (bin or tote). A portion of a sample packing (or pick) check sheet is shown in Table 4. A packing check sheet identifies the parts (by part number from the BOM data) and production line delivery location (by case/zone from the BOM data).

TABLE 4

Partial Packing Check Sheet (Pick Sheet)

| ITM | Loc | Div Loc | Part Number | C O L. | Ord Qty | CIO Qty | Ship Qty | PKG CHK | Cont Type |
|---|---|---|---|---|---|---|---|---|---|
| 1 | | LH | ABC123456 | | 100 | 0 | 60 | | |
| 2 | | LH | ABC123456 | | 100 | 0 | 60 | | |
| 3 | | LH | ABC123456 | | 100 | 0 | 120 | | |
| 4 | | LH | ABC123456 | | 100 | 0 | 240 | | |

Each package of bulk parts from a supplier has a two-dimensional (2D) barcode label that provides detailed information about the part. Referring to FIG. 2, a sample 2D barcode label is shown. Each 2D barcode label 110 provides the detailed information 112 shown in FIG. 2. The barcode labels are added to each bag or container of parts that the supplier provides to the manufacturer. The manufacturer specifies the information to be provided on the label including an applicable lot number, part number, and production line delivery location. The label further includes a control number, case number, packing number, packing serial number, and model year. The 2D barcode label data is used to generate a unique serial number that is then used for tracing the parts from the point of packing (or "picking") until they are delivered to the production line and installed or used in a product.

Figure 3:
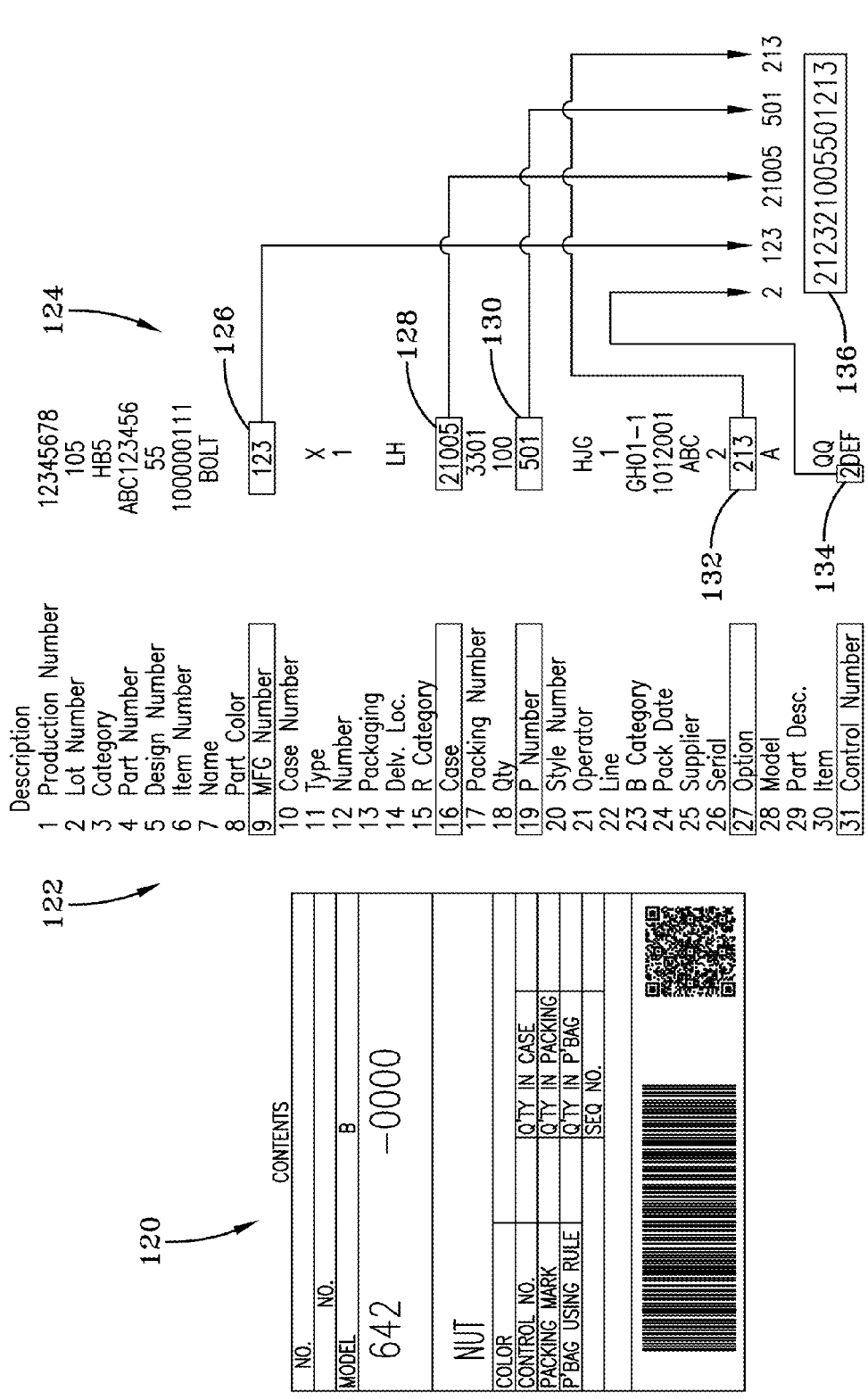
FIG. 3 is a process for generating a unique serial number according to an example embodiment.

Referring to FIG. 3, a process for generating a unique serial number is shown. Data 124 from selected fields 122 of the 2D barcode 120 for the original package label are used to generate a serial number. In the example of FIG. 3, a control number (2) 134, a manufacture number (123) 126, a case number (21005) 128, a packing number (501) 130, and an option number (213) 132 are used to generate a serial number (212321005501213) 136. Each unique serial number is used in labeling repacked parts so that the origin of the repacked parts can be determined.

Figure 4:
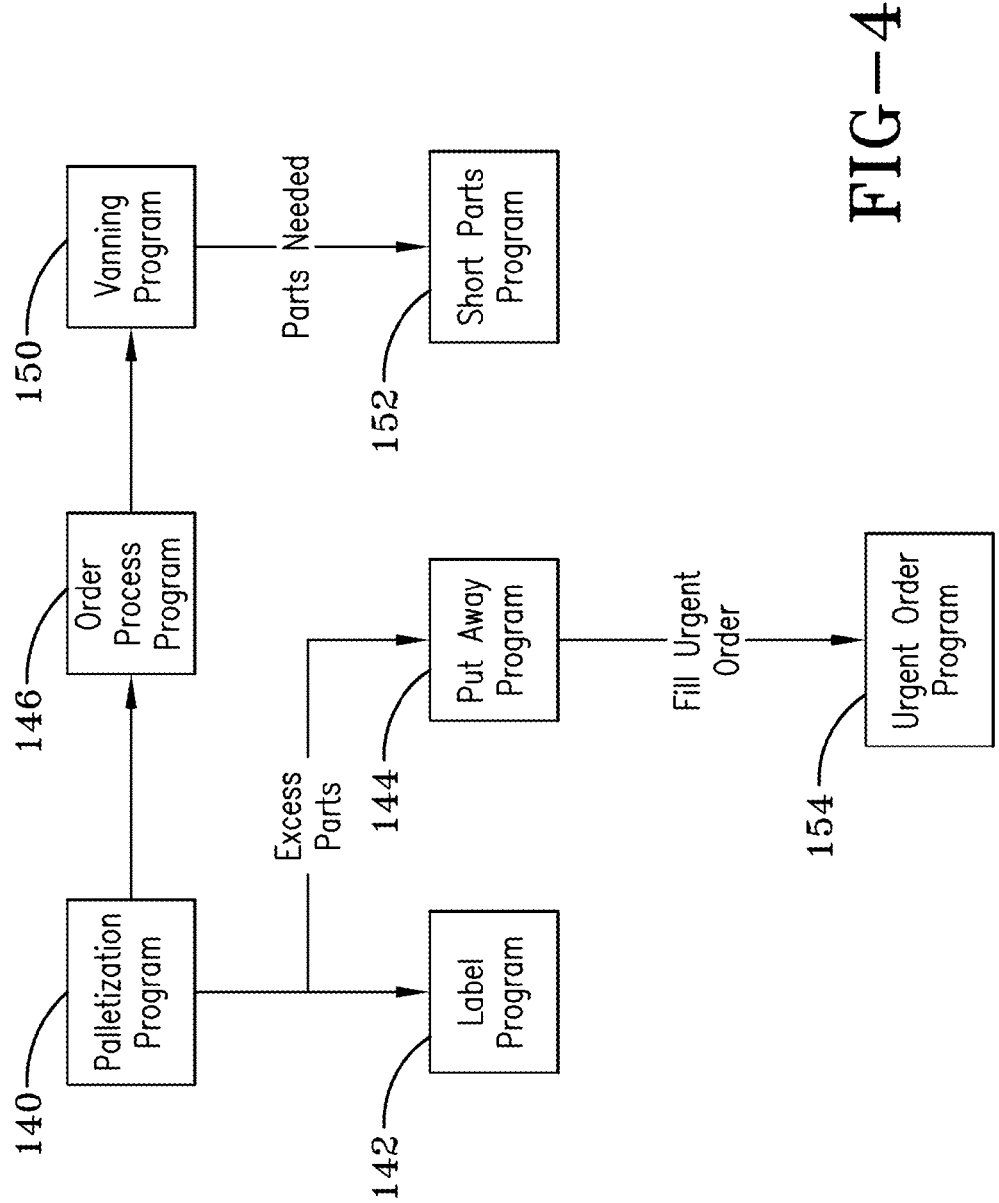
FIG. 4 is a block diagram of primary components according to an example embodiment.

Referring to FIG. 4, a block diagram of primary components for an example embodiment is shown. A "palletization" procedure facilitates repacking of bulk parts for use on a production line. Bulk parts are removed from the supplier's packaging 140, packed into other containers (e.g., bags or boxes), and labeled for delivery to the production line. A "label" procedure facilitates dividing and consolidating bulk parts for use on the production line 142. Multiple bags or boxes may be added to a single delivery container (bin or tote) that is delivered line side to a specified production line location. A "put away" procedure 144 facilitates handling of excess parts. Some shipments of parts may have excess parts because the supplier ships more parts than are needed or because the production schedule changes. Excess parts are labeled and tracked so that they may be used later when parts shortages occur. An "urgent order" or exception purchase order process procedure 146 facilitates locating of excess parts when shortages are identified.

If a parts shortage is identified during the palletization procedure, an "exception purchase order process" procedure 148 is used to locate parts that may be used to fill the shortages. A "vanning" procedure 150 determines whether needed parts are on trucks in the manufacturing facility's trailer yard. The needed parts are located and delivered for use in the palletization and label procedures. The parts that are located and used to fulfill the shortage may be designated for different production lots. Lot information is tracked in the computer applications and therefore, lot mismatches are managed. The parts that are used in the process are tracked in a "short parts" program to ensure that are parts are replenished for future production.

If the application determines that the needed parts are not available at the facility trailer yard, an exception purchase or urgent order procedure 154 is invoked to order the needed parts. The manufacturer orders the parts that are needed and delivery of the parts is expedited so that production can continue according to the production schedule.

Figure 5:
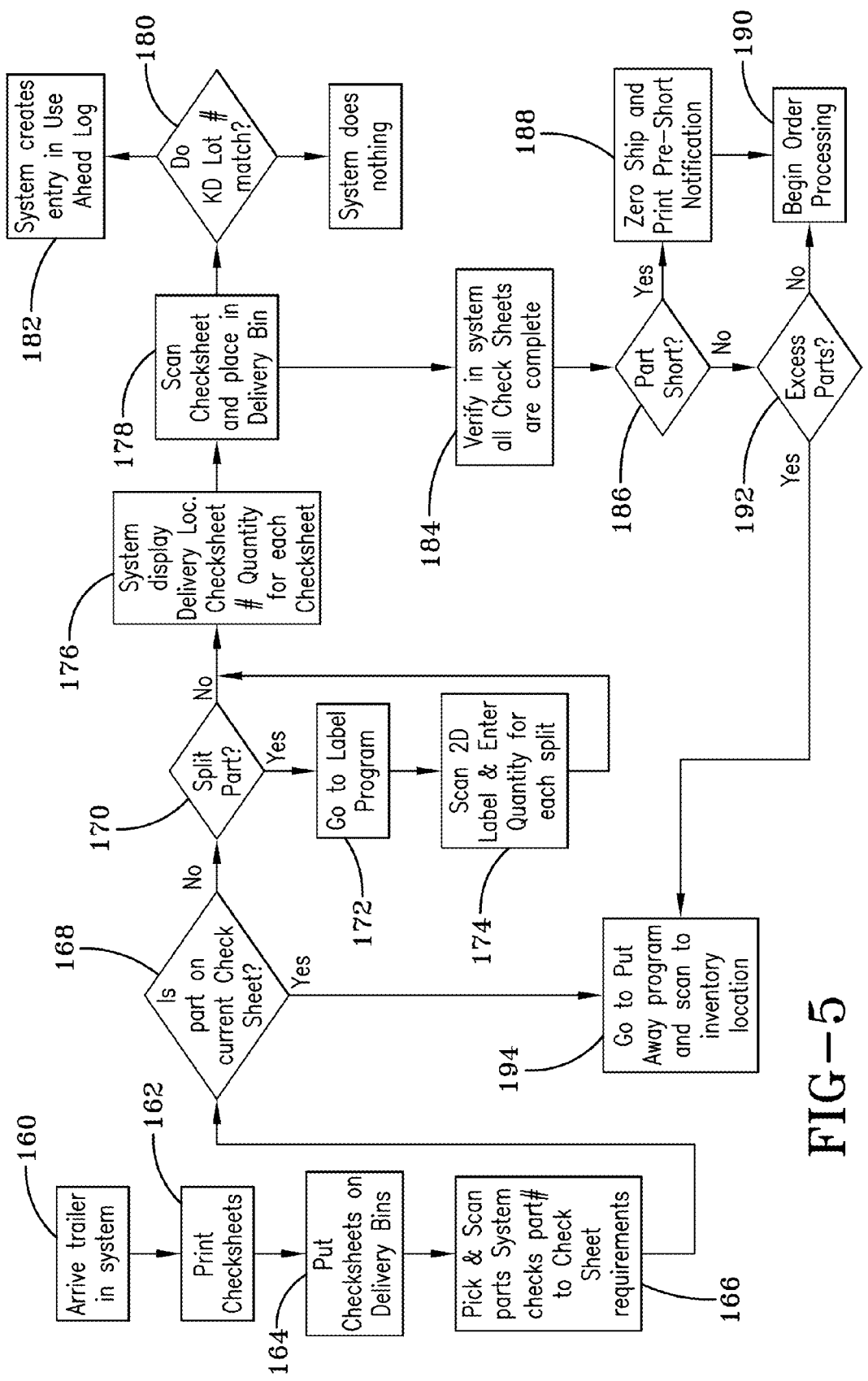
FIG. 5 is a flow diagram for a palletization procedure according to an example embodiment.

Referring to FIG. 5, a flow diagram for a palletization procedure according to an example embodiment is shown. Data for bulk parts that arrive in trailers is entered and stored in a manufacturer's order inventory system computer. The order inventory system computer provides availability information regarding bulk part shipments received from suppliers. Packing check sheets are generated and correspond to the bulk parts received from a supplier. A sample check sheet is shown in Table 5. The check sheet identifies the manufacturing sequence (e.g., 1027) and production lots (e.g., 104) in which the parts are expected to be used. The parts are identified by number on the check sheet. Also specified on the check sheet are the production line location where the parts are to be delivered (e.g., LH) and the ordered and shipped quantities (e.g., 500; 100). The packing check sheet also has a 2D barcode with the same data printed on the check sheet as well as additional data not shown on the check sheet. Each package of parts in the shipment has its own label with applicable production sequence, lot, delivery location, and quantity information that corresponds to the check sheet data.

TABLE 5

Packing Check Sheet
Packing Check Sheet
Issued: Oct. 1, 2009  13:46:37
Mfg Sequence # : 0020

Load Date :    Oct. 1, 2009  *3773334*
Load # :       052
Trailer Code : 48            (BAR CODE)
Pull # :       0
Returnable :
Lot :          175
Model Types :  A
Case :         XX

| ITM | Loc | Div Loc | Part Number | COL. | Ord Qty | C/O Qty | Ship Qty | PKG CHK | Cont Type |
|---|---|---|---|---|---|---|---|---|---|
| 29 | | LH | ABC123456 | | 100 | 0 | 100 | | |
| 30 | | LH | ABC123456 | | 100 | 0 | 100 | | |
| 31 | | LH | ABC123456 | | 100 | 0 | 100 | | |
| 32 | | LH | ABC123456 | | 100 | 0 | 100 | | |
| 33 | | LH | ABC123456 | | 100 | 0 | 100 | | |
| LH | | | | | | | | | |

The order inventory computer system has data for parts that have arrived at the logistics facility 160. The associate logs into the order inventory system computer and selects a "palletization" application that executes on the computer. An associate following the palletization procedure starts with the production schedule and the check sheets applicable to the day's production 162. A check sheet is printed and placed in each delivery container to be used in delivering parts to the production line 164. For an incoming bulk parts shipment, the associate verifies that the shipment is intended for use in the day's production. A separate delivery location sheet may be attached to the shipping containers.

The associate unpacks the shipping container and scans the 2D barcode for each package of parts picked from the container 166. The barcode data is compared to the check sheet data. The palletization application displays a delivery container code and bin address if the part requires one. The bin address identifies a location or section within the delivery container where the parts should be loaded for delivery to the production line. Most parts may be transferred directly from the supplier's shipping container to a delivery container or bin address within a delivery container.

The palletization application checks the quantity of parts in the package received from the supplier against the check sheet quantity and alerts the associate if the part is a "divide part" 168. The palletization application determines that parts must be divided if the quantity scanned from the original supplier package exceeds the quantity required for production 170. Bulk parts that are received in a single package may need to be divided and loaded in different delivery containers for use in different locations on the production line. A "divide part" application is executed automatically when parts need to be divided. A "divided part" is repacked from its original supplier package into smaller packages for delivery to the production line. If the palletization application indicates an original parts package in a shipment needs to be divided or split, the associate takes the parts to a "divide area" where the parts are placed into different packages (bags, boxes, or containers) and new labels for each resulting package is generated.

A "divide parts" application facilitates the handling of the divided parts. The divide parts application generates a new label for each new package that is loaded with parts from the original shipping package 172. The labels identify the part number, delivery location, production sequence, and lot number as indicated on the original label and the new quantity as determined by the "split." Each label also has a unique serial number. The associate returns to the palletization application. The new label is scanned so that the information regarding the new package of parts is recorded in the order inventory system computer 174.

A sample label generated by a "split parts" or consolidation application is shown in Table 6. The palletization application automatically prints labels as needed based on data entered by an associate.

TABLE 6

Sample Label

CONTENTS

| | | | |
|---|---|---|---|
| NO. | 001-110 | | |
| ORDER LOT NO. | 105 | | |
| MODEL | A | | |
| ABC123456 | | X | |
| | WHEEL | | |
| COLOR CONTROL NO. | 5 | QTY IN CASE | 500 |
| PACKING MARK | 38 | QTY IN PACKING | 500 |
| P'BAG USING RULE | | QTY IN P'BAG | 10 |
| | 21 | SEQ. NO. | 5 |
| (BAR CODE) | | | (2D BAR CODE) |

The palletization application identifies a delivery container and bin address (if applicable) where the new parts packages should be loaded. The associate locates the specified delivery container and scans the check sheet for the delivery container so that the loading of the parts is recorded.

Sometimes when scanning incoming bulk part shipments or later during the palletization process, an associate may scan parts that are not currently needed for production. The quantity of parts in a shipment may exceed the quantity needed for production or excess parts may be identified during a repacking procedure. If an associate attempts to scan excess parts to a check sheet 168, 192, a "put away" application is executed 194. The "put away" application facilitates handling and tracking of excess parts so they may be used in future shortages. The associate places the excess parts in a bag or other package. A label for the excess parts is generated and attached to the excess parts bag or package. The label is scanned and the put away application identifies a container where the parts are to be placed. The associate adds the parts to the specified container. The inventory system computer then records where the excess parts are stored so that they can be located when needed for a parts shortage or for another reason.

When the parts for a production lot have been scanned and loaded in delivery containers, the palletization application displays the delivery location, check sheet number, and quantity for each item on the check sheet 176. Each check sheet is scanned and placed in a delivery container to identify the bulk parts in the container. If the lot number for a check sheet does not match the production schedule lot number, an entry is placed in a "use ahead" log 182. The check sheet scan verifies for the application that all check sheets are complete or notifies the associate that check sheets are not complete 184. If check sheets are complete, the delivery containers are loaded on pallets and loaded on a trailer or other vehicle for delivery to the production line locations indicated on the delivery containers.

If some check sheets are not complete, the palletization application shows the associate which ones are incomplete. Incomplete check sheets indicate that parts for the upcoming production sequence are missing. If the missing parts cannot be located in the shipping containers that have been unpacked 186, a "short parts" application is executed. The palletization application identifies the parts that are short 188. If the short parts cannot be located at the facility, an ordering process may be invoked to obtain the missing parts 190.

Figure 6:
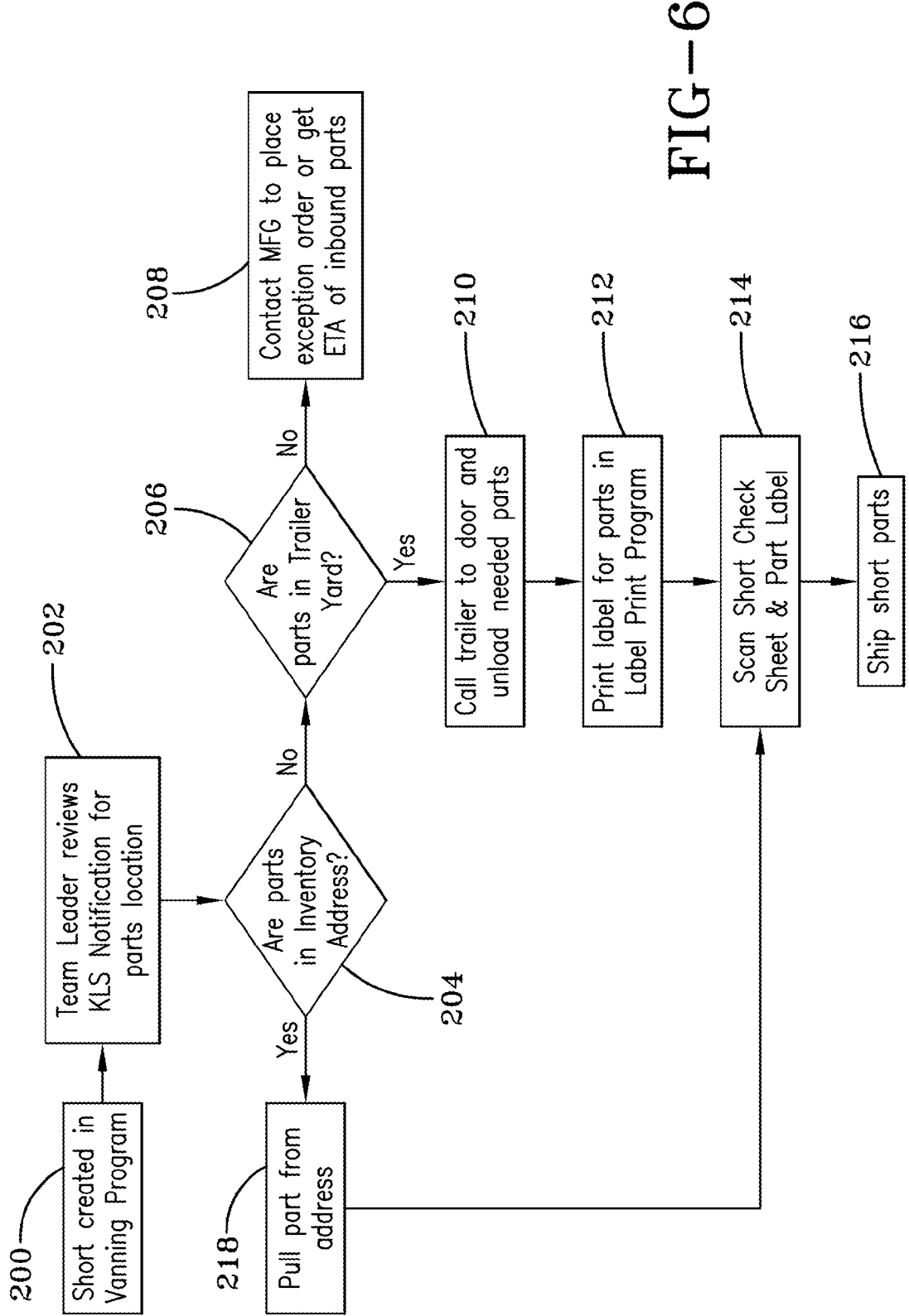
FIG. 6 is a flow diagram for a short parts application according to an example embodiment.

Referring to FIG. 6, a flow diagram for a short parts application according to an example embodiment is shown. The order inventory system computer identifies check sheets that are "unpalletized" or incomplete. The short parts application facilitates locating parts that have been determined to be in short supply. If the short parts can be located in a timely manner and delivered line side, production can continue according to the production schedule and no delays in production occur.

To begin the process of locating parts, an associate enters part numbers for parts that have been identified as "short" on the check sheet 200. The application generates a "pre-short notification" for each part entered by the associate. The application searches the order inventory system computer database to determine if the part is located in inventory (possibly as a result of a prior "put away" operation) or located in a trailer in the manufacturer's trailer yard. If the part is located at the manufacturer's facility, the application displays the location in the pre-short notification 202. A sample short part notification sheet is shown in Table 7. The sheet identifies the part, the associated lot number, and the quantity shortage. It also shows the inventory status so the associate can see whether the part is in the facility or in the trailer yard at the facility.

TABLE 7

Short Part Notification Tag

| Short Part Notification Tag | | Jun. 14, 2009 | | |
|---|---|---|---|---|
| Line # : | 1 | SPT PLATE COMP, SPARE TIRE | | |
| Part # : | ABC123 | Supplier: XYZ ALABAMA INC. | | |
| Lot # : | 227 | | | |
| Qty Short : | 30 | | | |
| Check Sheet Info | | General Info. | | |
| MFG. Seq. # : | 120 | Date & Time : | Jun. 14, 2009 08:00:09 | |
| Case/Dlvy/Loc. : | 18/LH | Associate : | Smith | |
| Trailer Code : | 50 | Short # : | 0082965 | |
| Crt. Ship Time : | Jun. 14, 2009 09:37:30 | | | |
| Location : | N | | | |
| Load Number : | 7 | | | |
| Curretn Inventory Status | | | | |
| Inventory In-House | | | | |
| Last Recieved Order : | 52 | Date : | | |
| Last Recieved Lot : | 32 | Time : | | |
| Containers on the Floor for the Line # 1 | | | Container Type : | |
| 508 | 60 | May 24, 2009 | 646 | 60 | Apr. 28, 2006 |
| 508 | 60 | May 13, 2009 | 118 | 60 | Apr. 17, 2006 |
| Inventory In-Yard | | | | |
| Trailer Number : | DMLI 779210 | | | |
| Yard Location : | UNLOADED | | | |
| Qty in Trailer : | 500 | | | |
| Lot Range : | 228 thru 247 | | | |
| Order Number : | 41 | | | |

If the parts are available within the manufacturer's facility 204, the associate requests delivery of the parts from the location shown on the short part notification 218. If the parts are taken from inventory, they already have a label from the "put away" procedure. If the parts are available from the manufacturer's trailer yard 206, the associate calls the trailer to the logistics facility 210. A label is then generated for the parts 212. For parts located from inventory or the trailer yard, the check sheet is scanned and the part labels are scanned. The associate may be required to respond to a series of prompts or to perform a series of actions to allow scanning of additional parts to the check sheet. Once the full quantity of parts is scanned, the application automatically "palletizes" that part so that it can proceed to delivery to the production line. The associate follows the palletization procedure described previously to add the parts to a delivery container.

During the "short part" palletization procedure as parts are scanned to check sheets, the application compares the lot number of the 2D barcode for the parts to the lot number identified on the check sheet. If they do not match, the application adds an entry for the parts to a "use ahead" log. The "use ahead" log allows the manufacturer to track parts that are removed from the normal production line delivery process as dictated by the production schedule and used in production earlier than planned. The use of parts in advance of planned production can cause additional shortages to occur. By tracking parts that are used out of sequence, the manufacturer can take actions to replenish the parts and ensure that a sufficient quantity of parts is available when production for which the parts should have been used actually begins.

If the parts are not available in the manufacturer's inventory or trailer yard, an associate locates another source for the parts or orders more parts directly from the supplier. It may be necessary to expedite delivery of the parts (e.g., ship by air) to meet the production requirements. Parts that are received via expedited delivery are processed using an exception purchase order procedure.

Figure 7:
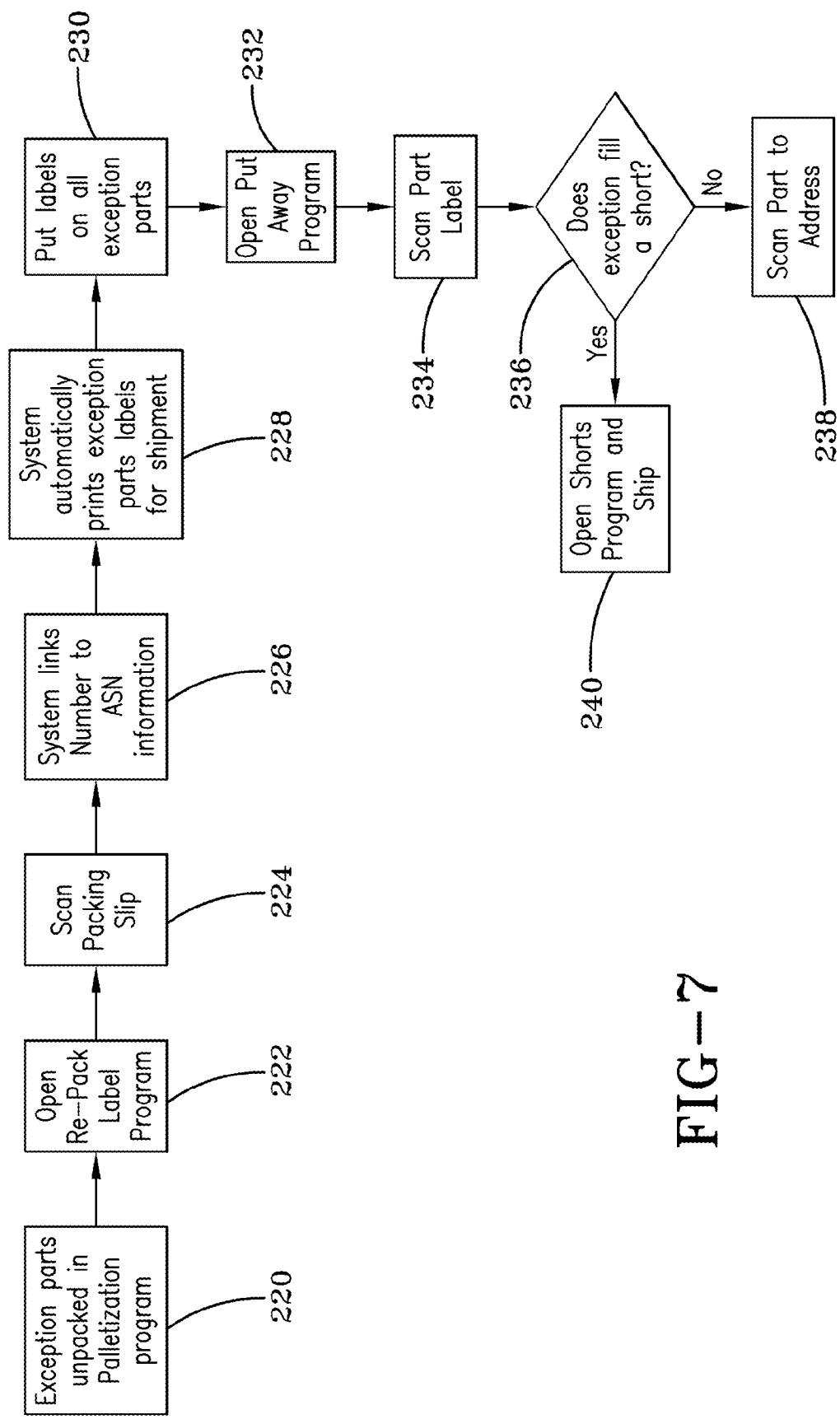
FIG. 7 is a flow diagram of an exception purchase order procedure according to an example embodiment.

Referring to FIG. 7, a flow diagram of an exception purchase order procedure according to an example embodiment is shown. When the exception purchase order procedure is initiated 220, an associate researches possible sources for the parts 222. When parts are received at the logistics facility, the repack application 222 facilitates relabeling of the new parts. An associate scans the packing slip for the parts 224. The packing slip data is used to locate associated ASN data for the part 226. The exception purchase order application prints new labels for the parts 228. The associate places the new labels on the parts 230. The associate then uses the "put away" application 232 and scans the part labels 234. The labels are matched with open or incomplete check sheets 236. If the parts match an item on an incomplete check sheet, they are added to the delivery container for the matched check sheet 240. If the parts do not match an item on an incomplete check sheet, they are scanned to the order inventory computer system and stored for later use 238.

Figure 8:
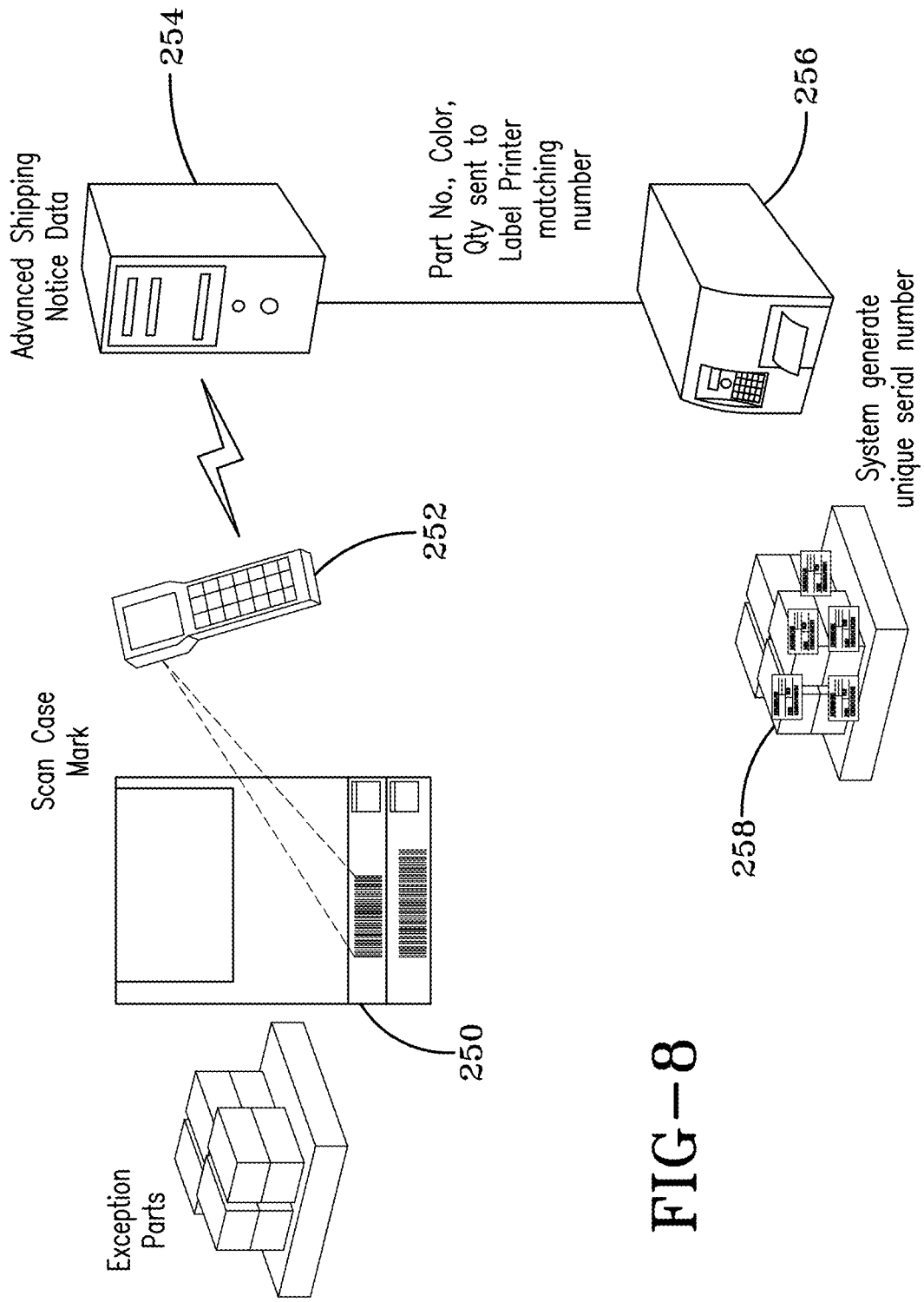
FIG. 8 is a process for generating labels for an exception purchase order parts procedure according to an example embodiment.

Referring to FIG. 8, a process for generating labels for exception purchase order parts according to an example embodiment is shown. The packing slip data 250 for the new parts is scanned (or entered by hand) 252 and used to locate in the order inventory computer system ASN data for the part 254. The ASN data has details for the parts that can be used for further processing. New labels with unique serial numbers for the parts are printed 256 and added to the packages for the parts 258. The part labels are scanned. If the parts are determined to correspond to a parts shortage, they are processed through the palletization application and added to delivery containers. Parts may be processed through the "divide parts" application if necessary. If the parts are not needed for a parts shortage, they are processed through the "put away" application, scanned, and assigned an address in inventory. If the ASN data does not have correct information such as a correct number of packages, the divide labels application can be used to print needed labels and to create a link between the new packages and the original expedited parts label.

Figure 9:
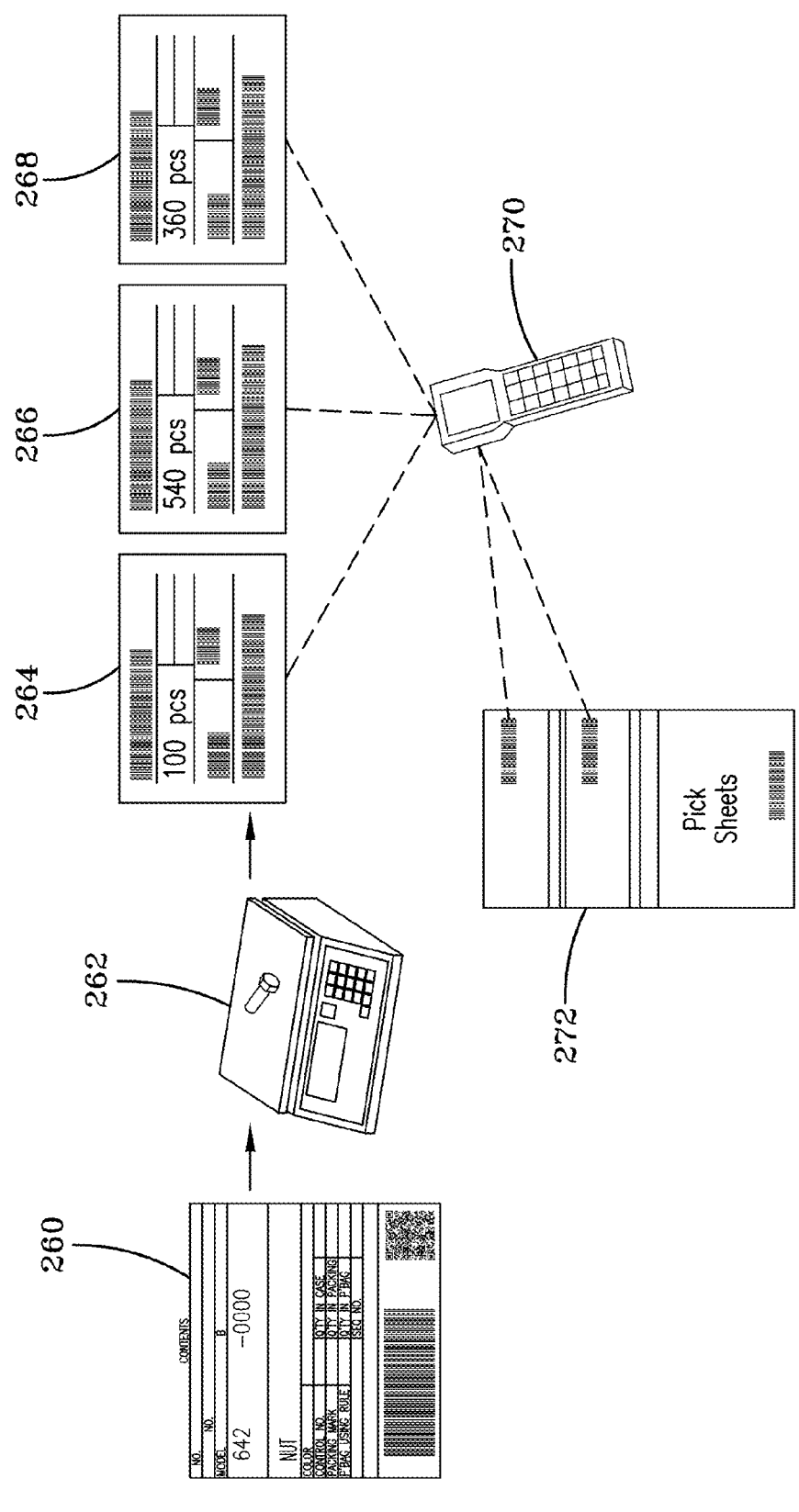
FIG. 9 is a flow diagram for a single origin divide parts procedure for an example embodiment.

Referring to FIG. 9, a flow diagram for a single origin divide parts procedure for an example embodiment is shown. In an example embodiment, bulk parts received in a single package 260 may be divided and added to multiple packages according to weight. Check sheets 272 are scanned 270 and indicate the number of packages to be created and the number of pieces that should be added to each package. Parts are weighed 262 and an appropriate number of pieces by weight are added to each package 264, 266, 268. Data from the check sheets is scanned and labels are then generated for the new packages. The unique serial number for each package links the new packages to the original shipping package.

Figure 10:
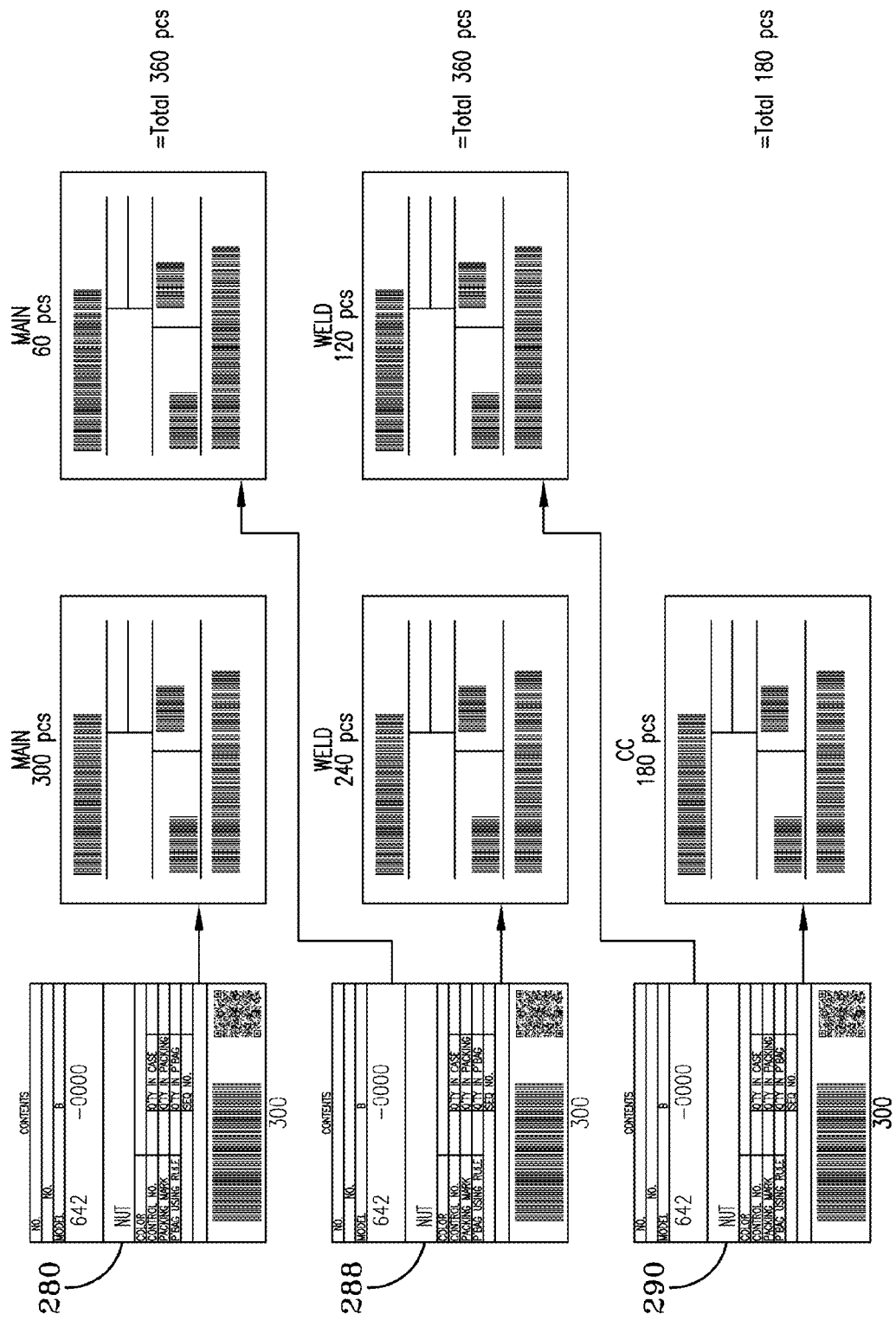
FIG. 10 is a flow diagram for a multiple origin divide parts procedure for an example embodiment.

Referring to FIG. 10, a flow diagram for a multiple origin divide parts procedure for an example embodiment is shown. Parts received in multiple packages may be divided and added to new packages according to weight. In the example, each original package 280, 288, 290 may contain 300 pieces of the bulk part. Check sheets indicate how the parts should be divided and packaged for production line delivery. Table 8 illustrates a process for dividing parts originating from multiple sources.

TABLE 8

Multiple Origin Divide Parts

| Production Line Location | Total Number of Parts Required | Number of Packages | Pieces/Package |
|---|---|---|---|
| ML | 100 | 2 | 50 |
|  |  |  | 50 |
| WD | 100 | 2 | 50 |
|  |  |  | 50 |
| PP | 100 | 1 | 100 |

The unique serial numbers for the packages links the new packages to the original shipping package.

Figure 11:
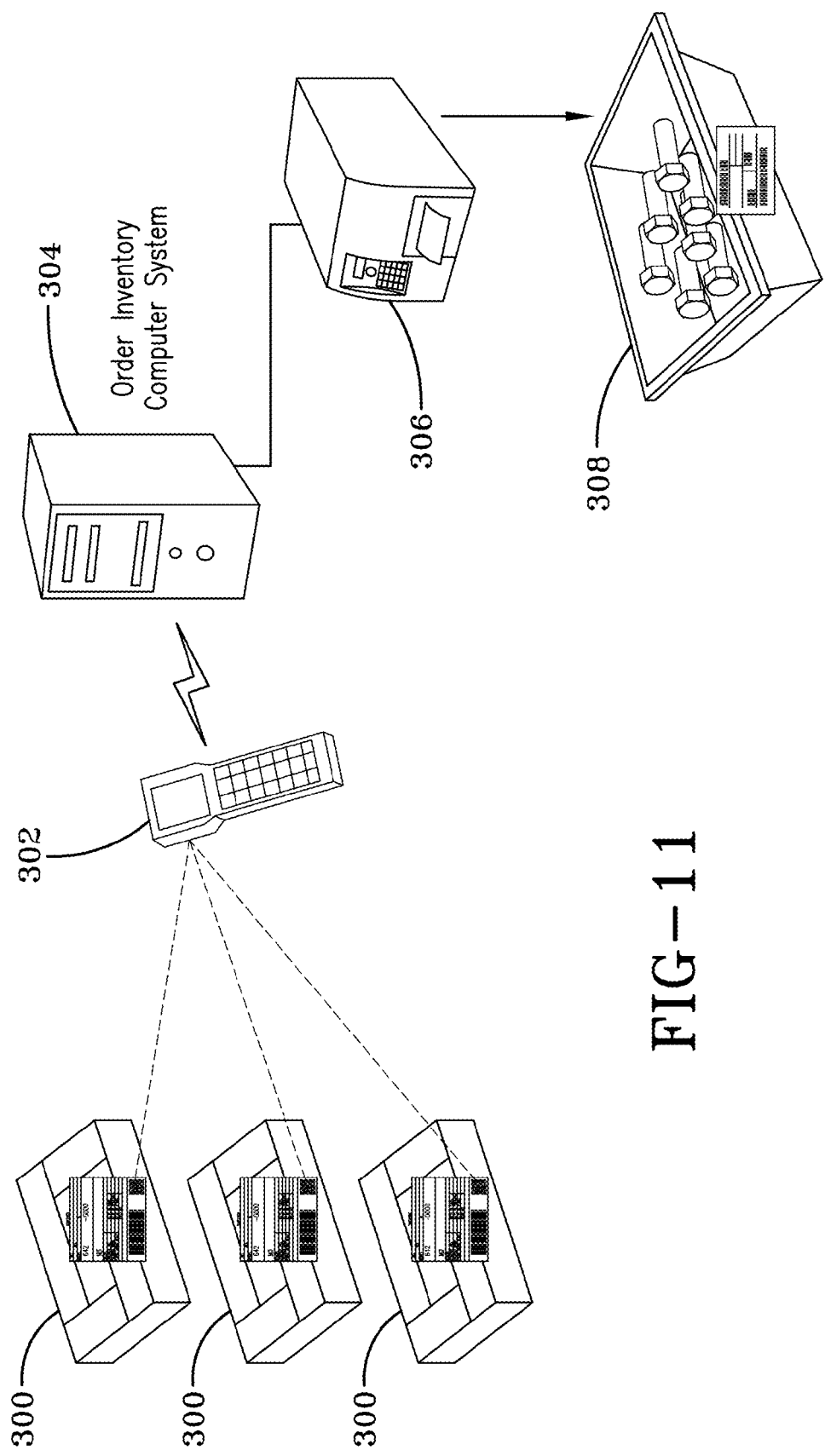
FIG. 11 is a flow diagram for a consolidate parts procedure according to an example embodiment.

Referring to FIG. 11, a flow diagram for a consolidate parts procedure according to an example embodiment is shown. Parts received in multiple packages 300 may be consolidated into a single delivery container 308. The labels for each original shipping package are scanned 302. The data for the scanned labels is processed through the consolidate parts application of the order inventory computer 304 and a new label 306 for the delivery container is generated and attached to the container 308.

Table 9 summarizes print label operations that may be provided in a label application according to an example embodiment of the present invention.

TABLE 9

Print Label Operations

| Reason | Actions |
|---|---|
| Quantity Changed | 1. Scan part number, color, quantity. |
|  | 2. Enter number of labels to print. |
|  | 3. Select "enter" to print labels. |
| Replacement Damaged/Not Scannable (A) | Serial numbers scanned on this screen are for same Part Number and Quantity. |
|  | 1. Screen displays part number and quantity. |
|  | 2. Select "enter" to print label. |
|  | If multiple labels with same part number but different quantity are needed, print new labels with new serial numbers. |
| Replacement Damaged/Not Scannable (B) | 1. Screen prompts for production control number on original 2D label. |
|  | 2. Select "enter" to print label. |
| Divide Container (2D label) | 1. Scan barcode |
|  | 2. Select "enter" |
|  | 3. Enter number of divides and quantities. |
|  | 4. Select "enter" to print label. |
| Divide Container (1D label) | 1. Enter Serial Number |
|  | 2. Select "enter" |
|  | 3. Enter number of divides and quantities. |
|  | 4. Select "enter" to print label. |
| Consolidate (2D label) | 5. Scan barcodes for each container (same parts) |
|  | 6. Select "enter" to print label. |

TABLE 9-continued

Print Label Operations

| Reason | Actions |
| --- | --- |
| Consolidate (1D label) | 7. Enter Serial Numbers to container (same parts)<br>8. Select "enter" to print label. |

Table 10 summarizes additional print label operations that may be provided in a label application according to an example embodiment of the present invention. Print label procedures to print labels for reprint, divide, consolidate, and exception order purchase parts are shown.

TABLE 10

Additional Print Label Operations

| Reason | Actions |
| --- | --- |
| Reprint Label | Reprint a label with same serial number as sent by supplier.<br>1. Enter serial number or supplier and ASN data<br>2. Select "enter" to print label. |
| Combine Multiples into 1 Label | Repack same parts from containers with different serial numbers and update the quantity.<br>1. Enter serial number or supplier and ASN data<br>2. Select "enter" to print label. |
| Divide into Multiples | Divide parts quantity from container with one serial number to multiple containers with serial numbers.<br>1. Enter original serial number.<br>2. Enter number of divides.<br>3. Enter quantities for each divide.<br>4. Select "enter" to print label. |
| Print Labels for exception parts | Print labels for exception purchase order parts without labels.<br>1. Enter or scan production control number.<br>2. Select "enter" to print. |
| Divide Container (1D label) | 1. Enter serial number.<br>2. Enter number of divides.<br>3. Enter quantities for each divide.<br>4. Select "enter" to print label. |
| Consolidate (2D label) | 1. Scan barcodes for each container (same parts)<br>2. Select "enter" to print label. |

The computer applications for an example embodiment of the present invention allow a manufacturer to track bulk parts and create a history for bulk parts that are received from many suppliers. The applications and related procedures prevent loading of delivery containers with the wrong parts in the wrong quantities and miss-shipments of parts to production line locations. The applications also prevent unnecessary parts shortages by tracking and recording information about parts used outside the normal production sequence. As a result, the manufacturer can take appropriate action to replenish parts that are used out of sequence.

An exemplary embodiment of a computerized parts control system and has been shown and described above. It should be realized by one skilled in the art that various modifications may be made to features and functionality of the various computer applications described above as well as process steps relevant to the system and method. Therefore, while certain embodiments of the present invention are described in detail above, the scope of the invention is not to be considered limited by such disclosure, and modifications are possible without departing from the spirit of the invention as evidenced by the following claims:

What is claimed is:

1. A computerized method for tracking bulk parts used in manufacturing comprising:
   (a) providing at a computer bulk part data comprising for a plurality of bulk parts:
   (1) part identifying data;
   (2) a production quantity associated with said part identifying data; and
   (3) a delivery line location associated with said part identifying data;
   (b) receiving at said computer data from a first barcode label for a first package comprising a first quantity of bulk parts, said first barcode label comprising data for a plurality of data fields;
   (c) generating at said computer a unique serial number comprising data from said plurality of data fields contained in said first barcode label;
   (d) entering in a database at said computer a record with data comprising said unique serial number and data from said first barcode label;
   (e) generating at said computer a second barcode label for a second package comprising parts from said first package, said second barcode label comprising:
   (1) said part identifying data;
   (2) a second quantity associated with said part identifying data;
   (3) said delivery line location associated with said part identifying data; and
   (4) said unique serial number;
   (g) adding to said record with data comprising said unique serial number:
   (1) said part identifying data;
   (2) said second quantity associated with said part identifying data; and
   (3) said delivery line location associated with said part identifying data;
   (h) accessing at said computer data using said second barcode label; and
   (i) accessing at said computer using said unique serial number from said second barcode label data regarding said first package of bulk parts for display to a computer user.

2. The method of claim 1 wherein said production quantity of bulk parts associated with said part identifying data is less than said firsta quantity of bulk parts contained in said first package.

3. The method of claim 1 wherein said second quantity of bulk parts associated with said part identifying data for said second package is a quantity equal to said production quantity.

4. The method of claim 2 wherein said computer executes an application to add excess parts to inventory if said production quantity is less than said first quantity of bulk parts contained in said first package.

5. The method of claim 1 wherein said production quantity of bulk parts associated with said part identifying data is greater than said first quantity of bulk parts contained in said first package.

6. The method of claim 5 wherein said computer executes an application to obtain parts from a trailer yard if said production quantity is greater than said first quantity of bulk parts contained in said first package.

7. The method of claim 1 wherein said production quantity associated with said part identifying data is a quantity selected from the group consisting of a number and a weight.

8. A computerized system for tracking bulk parts used in manufacturing comprising:
   (a) a computer generated check sheet comprising a list of a plurality of bulk parts to be packed in a delivery container and delivered to a specified production line location, said check sheet comprising for each of said plurality of bulk parts:

(1) part identifying data for said bulk part;
(2) a production quantity associated with said part identifying data; and
(3) a delivery line location associated with said part identifying data;
(b) a barcode scanner for receiving data from a first barcode label for a first package comprising a first quantity of bulk parts, said first barcode label comprising data for a plurality of data fields;
(c) a computer for receiving said data from said first barcode label and generating a unique serial number comprising data from said plurality of data fields contained in said first barcode label;
(d) a database at said computer for storing a record with data comprising said unique serial number and data for said first barcode label;
(e) a computer generated second barcode label for a second package comprising a second quantity of bulk parts associated with said part identifying data, said second barcode label comprising:
 (1) said part identifying data;
 (2) said second quantity associated with said part identifying data;
 (3) said delivery line location associated with said part identifying data; and
 (4) said unique serial number;
(f) wherein said computer is configured to execute a process comprising instructions to:
 (1) add to said record with data comprising said unique serial number:
  (A) said part identifying data;
  (B) said second quantity associated with said part identifying data; and
  (C) said delivery line location associated with said part identifying data;
 (2) receive a request to access data from said first barcode label using said unique serial number; and
 (3) access at said computer using data from said first barcode label additional data regarding said first package of bulk parts for display to a computer user.

9. The system of claim 8 wherein said production quantity of bulk parts associated with said part identifying data is less than said first quantity of bulk parts contained in said first package.

10. The system of claim 8 wherein said second quantity of bulk parts associated with said part identifying data for said second package is a quantity equal to said production quantity.

11. The system of claim 9 wherein said computer executes an application to add excess parts to inventory if said production quantity is less than said first quantity of bulk parts contained in said first package.

12. The system of claim 8 wherein said production quantity of bulk parts associated with said part identifying data is greater than said first quantity of bulk parts contained in said first package.

13. The system of claim 12 wherein said computer executes an application to obtain parts from a trailer yard if said production quantity is greater than said first quantity of bulk parts contained in said first package.

14. The system of claim 8 wherein said production quantity associated with said part identifying data is a quantity selected from the group consisting of a number and a weight.

15. A computerized method for tracking bulk parts used in manufacturing comprising:
(a) generating at a computer a check sheet for packing a plurality of bulk parts in a delivery container to be delivered to a specified production line location, said check sheet comprising for each of said plurality of bulk parts:
 (1) part identifying data for said bulk part;
 (2) a production quantity associated with said part identifying data; and
 (3) a delivery line location associated with said part identifying data;
(b) receiving at said computer data from a first barcode label for a first package comprising a first quantity of bulk parts, said first barcode label comprising data for a plurality of data fields;
(c) generating at said computer a unique serial number comprising data from said plurality of data fields contained in said first barcode label;
(d) entering in a database at said computer a record with data comprising said unique serial number and data from said first barcode label;
(e) adding from said first package to said second package said production quantity of bulk parts;
(f) generating at said computer a second barcode label for said second package, said second barcode label comprising:
 (1) said part identifying data;
 (2) said production quantity associated with said part identifying data;
 (3) said delivery line location associated with said part identifying data; and
 (4) said unique serial number;
(g) adding to said record with data comprising said unique serial number:
 (1) said part identifying data;
 (2) said production quantity associated with said part identifying data; and
 (3) said delivery line location associated with said part identifying data; and
(h) accessing at said computer said data using said second barcode label; and
(i) accessing at said computer using said unique serial number from said second barcode label data regarding said first package of bulk parts for display to a computer user.

16. The method of claim 15 wherein said production quantity of bulk parts associated with said part identifying data is less than said first quantity of bulk parts contained in said first package.

17. The method of claim 15 wherein said second quantity of bulk parts associated with said part identifying data for said second package is a quantity equal to said production quantity.

18. The method of claim 16 wherein said computer executes an application to add excess parts to inventory if said production quantity is less than said first quantity of bulk parts contained in said first package.

19. The method of claim 15 wherein said production quantity of bulk parts associated with said part identifying data is than said first quantity of bulk parts contained in said first package.

20. The method of claim 19 wherein said computer executes an application to obtain parts from a trailer yard if said production quantity is greater than said first quantity of bulk parts contained in said first package.

21. The method of claim 15 wherein said production quantity associated with said part identifying data is a quantity selected from the group consisting of a number and a weight.

* * * * *

UNITED STATES PATENT AND TRADEMARK OFFICE
CERTIFICATE OF CORRECTION

PATENT NO. : 8,463,426 B1
APPLICATION NO. : 12/608699
DATED : June 11, 2013
INVENTOR(S) : Rogers et al.

Page 1 of 1

It is certified that error appears in the above-identified patent and that said Letters Patent is hereby corrected as shown below:

In the Claims:

In column 14, line 40, please delete "firsta" and insert -- first --.

In column 16, lines 55 through 58, please delete "19. The method of claim 15 wherein said production quantity of bulk parts associated with said part identifying data is than said first quantity of bulk parts contained in said first package." and insert -- 19. The method of claim 15 wherein said production quantity of bulk parts associated with said part identifying data is greater than said first quantity of bulk parts contained in said first package. --.

Signed and Sealed this
Sixth Day of August, 2013

Teresa Stanek Rea
*Acting Director of the United States Patent and Trademark Office*